United States Patent [19]

Roos

[11] 4,301,537
[45] Nov. 17, 1981

[54] MEANS AND METHOD FOR MAINTAINING SYNCHRONIZATION OF A SPREAD SPECTRUM OR OTHER RECEIVER CLOCK

[75] Inventor: John C. Roos, Thousand Oaks, Calif.

[73] Assignee: Bunker Ramo Corporation, Oak Brook, Ill.

[21] Appl. No.: 91,804

[22] Filed: Nov. 6, 1979

[51] Int. Cl.³ .............................................. H04L 7/00
[52] U.S. Cl. ...................................... 375/1; 375/108; 375/115; 331/1 A; 331/2
[58] Field of Search ..................... 331/1 R, 1 A, 2, 18, 331/47, 49; 343/5 AF; 360/38; 455/257, 258, 259, 260, 265; 375/1, 97, 108, 119, 120, 115

[56] References Cited

U.S. PATENT DOCUMENTS

| | | | |
|---|---|---|---|
| 3,113,291 | 12/1963 | Fiske | 375/108 |
| 3,865,981 | 2/1975 | Welch | 360/38 |
| 3,878,527 | 4/1975 | Rensin et al. | 375/1 |
| 4,121,172 | 10/1978 | Garde | 331/2 |

*Primary Examiner*—Benedict V. Safourek
*Attorney, Agent, or Firm*—F. M. Arbuckle; A. Freilich

[57] ABSTRACT

A system for synchronizing a clock signal generated by a lower stability clock generator to a received incoming signal whereby a higher stability clock generator is synchronized to the lower stability clock generator when the clock signal is synchronized to the incoming signal, and the lower stability clock generator is synchronized to the higher stability clock generator when the incoming signal is lost. More specifically, in a spread spectrum receiver for receiving a signal phase modulated by a pseudo-random code, a means for synchronizing a receiver pseudo-random code generator to the incoming code modulation is provided. The code generator is clocked by a relatively low stability voltage controlled crystal oscillator (VCXO) whose output frequency is controlled by an error signal created by a phase difference between the received code modulation and the output of the pseudo-random code generator. As the low stability VCXO tracks the code modulation, a high stability VCXO is provided to track in frequency and phase the low stability VCXO. If the incoming signal is lost, the high stability VCXO is configured to hold its frequency and phase and to control the frequency and phase of the low stability VCXO, thereby tending to retain the same phase and frequency relationship with respect to the modulation as was present when signal was lost.

18 Claims, 2 Drawing Figures

MEANS AND METHOD FOR MAINTAINING SYNCHRONIZATION OF A SPREAD SPECTRUM OR OTHER RECEIVER CLOCK

BACKGROUND OF THE INVENTION

The present invention relates to synchronization systems for clock signal generators utilized in rf receivers.

A typical direct sequence, spread spectrum system is characterized by a transmitter having an output signal comprising a continuous wave carrier phase modulated by a pseudo-random code. The pseudo-random code typically modulates the carrier at megahertz rates, thereby causing the modulated output signal to be spread out over a bandwidth of two times the code modulation rate. Reconstruction of the carrier signal by a receiver requires that a receiver local oscillator be phase-modulated by a pseudo-random code generator having the same pseudo-random code as that of the transmitted pseudo-random code, and that the two codes be synchronized in frequency and have a predetermined phase relationship with respect to each other. Conventional spread-spectrum receivers generally require that each time the incoming signal fades below the receiver threshold, the pseudo-random code generator in the receiver loses lock because of frequency instabilities associated with a clock generator clocking the pseudo-random code generator. Once synchronization is lost, the code generator must be resynchronized with the incoming signal, thereby resulting in both lost time and lost data. One solution to this problem is to clock the receiver pseudo-random code generator by an extremely high stability VCXO that will not drift significantly during periods when incoming signal is lost. However, attempts to use this approach have been generally unsatisfactory because a high stability VCXO is not adapted to track rapid frequency changes in the incoming pseudo-random code caused by variations in propagation path length or other natural phenomena. In addition, the clock signal must be capable of being moved off frequency by several thousand code bits per unit time relative to the transmitted pseudo-random code so that the codes can scan by each other for initial acquisition. All of these constraints upon the clock signal cannot be met by a VCXO having particularly good free-running frequency stability. Thus, conventional spread-spectrum receivers require a reacquisition of the pseudo-random code whenever the incoming signal drops below a predetermined level and synchronization is lost.

SUMMARY OF THE INVENTION

The present invention is directed to a system which solves the foregoing problems by providing a low stability voltage controlled oscillator (VCO) for clocking the pseudo-random code generator during periods when an incoming signal is present, and a high stability VCO for clocking the pseudo-random generator when the incoming signal is not present.

More particularly, the invention provides a system for maintaining synchronization of a clock signal and an incoming signal which includes a first oscillator having an output signal to be synchronized and a means for controlling the frequency and phase of the first oscillator by the incoming signal. A second oscillator is provided which has a significantly higher free-running frequency stability than that of the first oscillator. The second oscillator is caused to track the first oscillator in both phase and frequency during periods when the first oscillator is synchronized with the incoming signal and the incoming signal is present, and the first oscillator is caused to track the second oscillator during periods when the incoming signal is lost. Thus, during strong signal conditions a relatively low stability first oscillator tracks the incoming signal and during periods of signal fading when the incoming signal drops below a predetermined threshold level, a high stability oscillator is used to control the first oscillator in order to maximize the probability that the first oscillator will be in phase with the incoming signal when the signal returns.

In a specific embodiment of the invention, a spread spectrum receiver for receiving an rf signal phase modulated by a pseudo-random code includes a pseudo-random code generator having the same pseudo-random code output as that modulated on the received rf signal. The code generator is clocked by a relatively low stability voltage controlled crystal oscillator (VCXO). The code generator provides two output signals, offset in phase, which modulate a receiver local oscillator. The modulated signals are mixed with the incoming signal and envelope detected to provide two correlation signals, one signal being related to a lead in phase and the other signal being related to a lag in phase. When the pseudo-random code generator is precisely synchronized with the modulation code on the incoming signal, the two correlation signals are equal in magnitude. These two correlation signals are provided as input signals to a differential amplifier which are configured to have a zero output voltage when its input signals are equal. The differential amplifier output is connected to and controls the phase and frequency of the low stability VCXO. Thus, whenever the pseudo-random code generator either leads or lags the modulation code, the low stability VCXO is driven so that the two will become synchronized. A high stability VCXO is provided which tracks the low stability VCXO during periods of code synchronization. Whenever the incoming signal is lost, such as during signal fades, the high stability VCXO frequency control line is held at the level last assumed under conditions of sufficient incoming signal and the high-stability VCXO is made to control the low stability VCXO with its output signal. Thus, drift of the low stability VCXO becomes a function of the drift characteristics of the high frequency VCXO. By controlling the low stability VCXO frequency and phase in the above-described manner, the probability of the receiver pseudo-random code generator being synchronized with the modulated code when a faded signal returns is enhanced.

DETAILED DESCRIPTION

Figures 1, 2:
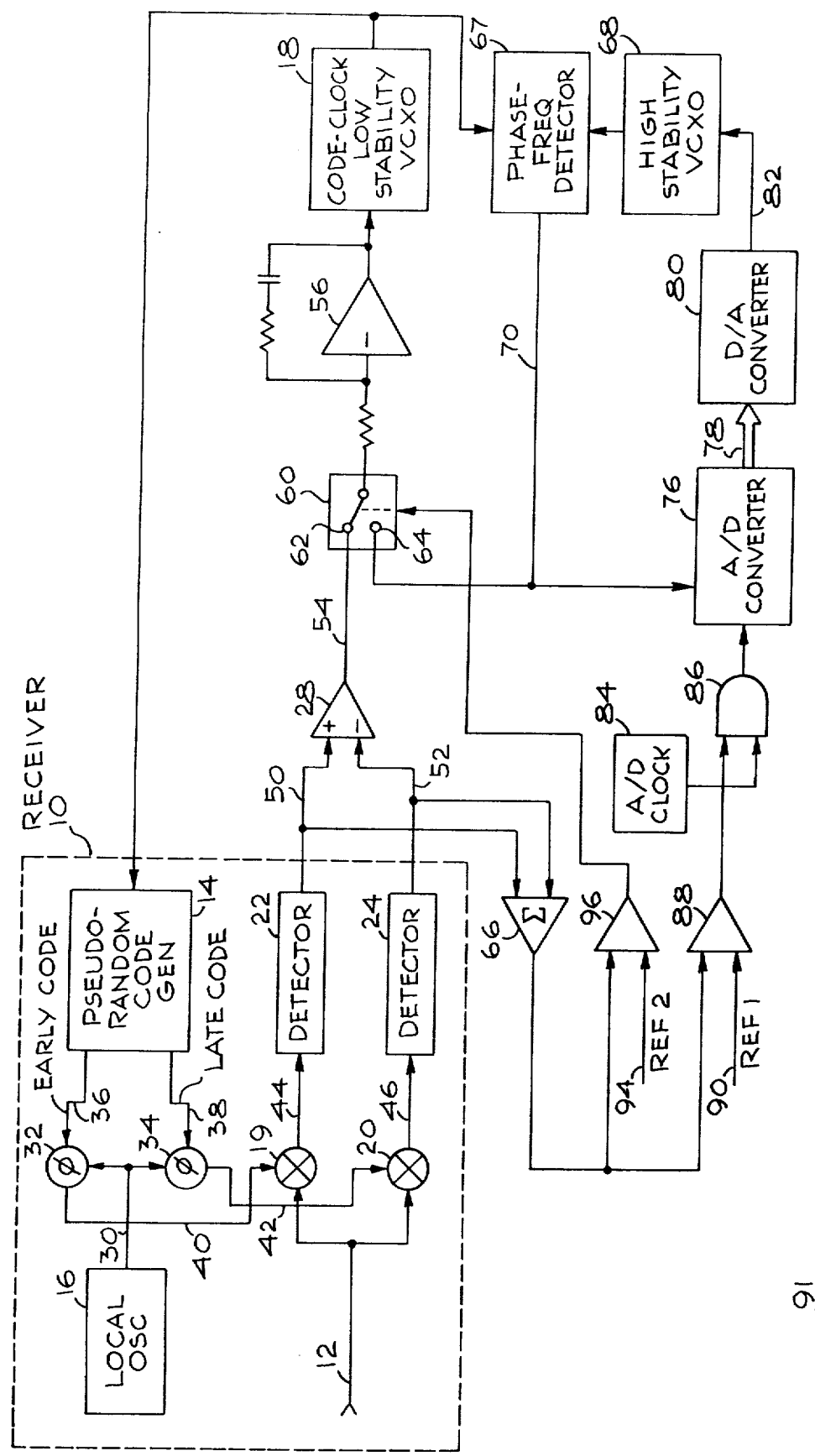
FIG. 1 is a block diagram of a synchronization system provided by the invention.
FIG. 2 is a waveform diagram showing the output voltage of one of the detectors under different correlation conditions.

A detailed illustrative embodiment of the invention disclosed herein exemplifes the invention and is currently considered to be the best embodiment for such purposes. However, it is to be recognized that other means for causing a low stability oscillator to track a high stability oscillator under predetermined conditions could be utilized and other implementations will occur to those familiar with the electronic art. Accordingly, the specific embodiment disclosed is only representative in providing a basis for the claims which define the scope of the present invention.

As previously explained, the invention provides a means for maintaining synchronization of a clock signal with an incoming signal during periods when the incoming signal is below a predetermined threshold level. In an exemplary embodiment, the incoming signal is phase-modulated by a pseudo-random code clocked at megahertz rates which causes the transmitted signal, after modulation, to be spread out over a bandwidth of two times the clock frequency. Reception of such a signal is accomplished by a conventional spread-spectrum receiver having a local oscillator whose output is modulated by a pseudo-random code generator having the same code as the modulation code on the incoming signal. Synchronization between the two codes must be to an accuracy better than one code bit or no useful output from the receiver will result. During periods when the incoming signal is below the receiver threshold, it is important that the receiver pseudo-random code generator continue to output the pseudo-random code at the same bit rate and phase as it did when the incoming signal was present. The pseudo-random code generator is clocked by a voltage controlled oscillator (VCO) having a relatively low free-running frequency stability so that it can follow rapid bit rate changes of the incoming pseudo-random code during periods of signal fading and during initial acquisition. During periods when the incoming signal is present, the phase and frequency of the low stability VCO output are controlled by a signal whose magnitude is related to a phase and frequency difference between the two pseudo-random codes. However, during periods when the incoming signal has faded, inherent signal drift in the relatively low stability VCO would result in a mismatch of the two pseudo-random codes when the incoming signal returns. To minimize the possibility of a mismatch, a second VCO having a relatively high free-running frequency stability is chosen to track the low stability VCO during periods when the two codes are synchronized, and to become free-running and control the low stability VCO when the incoming signal is lost. When the incoming signal reappears, the low stability VCO is again controlled by differences in phase and frequency between the two pseudo-random codes, and the high stability VCO again tracks the low stability VCO.

Referring now to FIG. 1, a receiver 10 has an input signal 12 which has been phase modulated with a pseudo-random code (hereinafter referred to as the modulation code) at the transmitted signal source. The input signal 12 could be provided directly from the receiver front end, or it could be at an intermediate frequency. The receiver 10 contains a pseudo-random code generator 14 (hereinafter referred to as the code generator) which generates the same modulation code as that modulated on the input signal 12. In order to demodulate the input signal 12, it is necessary that a receiver local oscillator 16 be modulated in time synchronization with the modulation code as received at the receiver 10. Accordingly, a clock signal which in this embodiment is sinusoidally shaped, is provided to the code generator 14 so that its output bit rate is in phase and frequency synchronization with the modulation code on the input signal 12. The clock signal is provided by a low stability voltage controlled crystal oscillator (VCXO) 18 which has a sufficiently low free-running frequency stability to be able to follow rapid phase and frequency changes in the modulation code. Although a crystal oscillator is utilized in the exemplary embodiment, other types of voltage controlled oscillators could also be utilized. Synchronization between the code generator 14 and modulation code must be to an accuracy of better than one code bit or no useful receiver output will result. Initial synchronization requires the code generator to scan the modulation code, a somewhat time-consuming process during which data cannot be obtained. Once initial synchronization is achieved, the synchronization means provided by the invention maximizes the probability of the code generator 14 maintaining synchronization with the modulation code when the input signal 12 is below the receiver 10 threshold as will be explained below.

A delay lock loop for maintaining synchronization between the modulation code and the code generator under strong input signal conditions includes first and second correlation mixers 19 and 20, respectively. The outputs of the correlation mixers 19 and 20 are applied to first and second envelope detectors 22 and 24, respectively. As will be explained below, each of the envelope detectors 22 and 24 has an output voltage related to the correlation or phase difference between the code generator 14 output code and the modulation code. A differential amplifier 28 is chosen so that equal output signals from the two envelope detectors 22 and 24 result in a zero output signal 30 from the differential amplifier 28. An output signal 30 from the local oscillator 16 is provided to first and second phase modulators 32 and 34. The code generator 14 is chosen so that two output codes differing in phase by a predetermined amount are provided. The first output 36 is designated as an early code signal and the second output 38 is designated as a late code signal. The two code signals 36 and 38 are obtained from successive stages within the code generator 14. The early code signal 36 is provided to the first phase modulator 32 and the late code signal 38 is provided to the second phase modulator 34. The output 40 from the first phase modulator 32 is provided to the first correlation mixer 19 and the output 42 from the second phase modulator 34 is provided to the second correlation mixer 20. Thus, the local oscillator output signal 30 is divided into two phase modulated signals 40 and 42 each containing a pseudo-random code from the code generator 14, the two codes having a predetermined phase differential with respect to each other. These two phase modulated signals 40 and 42 are provided to the first and second correlation mixers 19 and 20.

If the code generator 14 and the modulation code are synchronized, conventional mixing in the first and second correlation mixers, 19 and 20, will occur and all of the spectral lines will sum and difference so that a continuous wave output signal will be obtained from each of the correlation mixers 19 and 20. If the two signals are not in substantial phase and frequency synchronization, a series of beats will be obtained form the correlation mixers 19 and 20. Thus, the amplitudes of the output signals 44 and 46 from the first and second correlation mixers, 19 and 20 respectively, are related to the degree of synchronization between the modulation code and the code generator 14. A maximum output signal 50 from the first envelope detector 22 will only be obtained when the early code signal 36 is in precise phase synchronization with the modulation code. Similarly, a maximum output signal 52 from the second envelope detector 24 will only be obtained when the late code signal 38 is in precise phase synchronization with the modulation code. Equal outputs from the envelope detectors 22 and 24 will be obtained when the early code signal 36 and the late code signal 30 are symmetrically positioned about the modulation code and not offset from the modulation code by more than one code bit.

The differential amplifier 28 is chosen so that it will provide a positive output voltage when the output 50 of the first detector 22 is greater than the output of the second detector 24. Similarly, when the output 52 of the second detector 24 is greater than the output 50 of the first detector 22, the differential amplifier will provide a negative output voltage. The output signal 54 from the differential amplifier is provided through an inverting amplifier 56 to the low stability VCXO 18, thereby altering its frequency and phase until the code generator 14 is substantially in phase with the modulation code. When this in-phase condition occurs, the output of the differential amplifier 28 becomes zero. The above-described circuit operates in a conventional manner whereby the output bits of the code generator 14 are clocked by the low stability VCXO 18 which in turn is controlled by the degree of synchronization between the code generator 14 and the received modulation code. As previously explained, the VCXO 18 cannot have a relatively high free-running frequency stability and also accommodate the rapid frequency changes required during initial acquisition and rapid variations in propagation path length of the transmitted signal. Thus, it is important that a means be provided for enhancing the frequency stability of the low stability VCXO during brief periods of incoming signal fades.

Under strong signal conditions as above-explained, the code generator 14 tracks the modulation code by means of a delay lock loop. A two position switch 60 is in a first position 62 when the code generator 14 and the modulation code are synchronized under strong signal conditions, and in a second switch position 64 when the incoming signal fades. The strength of the incoming signal is determined by the output of a summing amplifier 66 which has both of the envelope detector output signals 50 and 52 as inputs. During strong signal conditions when the code generator and the modulation code are in phase, the output of the low stability VCXO 18 is applied to a phase-frequency detector 67. The output of a high stability VCXO 68, i.e., a VCXO having a more stable free-running frequency than the low stability VCXO 18, is provided to the phase-frequency detector 67. Again other types of high stability oscillators could be utilized, a crystal oscillator being chosen for the exemplary embodiment. The detector 67 determines whether the frequency and phase of the high stability VCXO 68 is greater or less than that of the low stability VCXO 18, and provides an error signal 70 related to any frequency or phase difference. This error signal is provided to an analog-to-digital converter 76, the output of which is provided as a digital signal 78 to a digital-to-analog converter 80. The digital-to-analog converter 80 provides an output signal 82 which alters the frequency and phase of high stability VCXO 68 until the output of the phase-frequency detector 67 is zero. Thus, during synchronized operation, the high stability VCXO 68 is caused to track the low stability VCXO 18. The analog-to-digital converter 76 could also be an up-down counter whose output is applied to the digital-to-analog converter 80. The high stability VCXO 68 can be a secondary frequency standard having an ability to be altered in frequency by about plus or minus one Hz. The analog-to-digital converter 76 is clocked by an A/D clock generator 84 through a clocking AND gate 86. The other input to the clocking AND gate 86 is the output of a first comparator 88 which receives as inputs the output of the summing amplifier 66 and a first predetermined reference voltage 90. As long as the sum of the envelope detector output signals 50 and 52 exceeds the first predetermined reference voltage 90, a high output provided by the first comparator 88 allows a clock signal from the A/D clock generator 84 to pass through the clocking AND gate 86 to the analog-to-digital converter 76. If the sum of the envelope detector output signals 50 and 52 are below the first predetermined reference voltage 90, then a low output from the first comparator 88 blocks the clock signal from passing through the clocking AND gate 86, thereby causing the high stability VCXO 68 to be driven to a frequency corresponding to that present when the output of the summing amplifier 66 dropped to a value below that of the first predetermined reference voltage.

FIG. 2 shows a waveform diagram of the voltage output of one of the envelope detectors 22 or 24 relative to the degree of synchronization. During strong input signal conditions, AGC circuit (not shown) in the receiver 10 maintains a signal level such that the output signal from one of the detectors 22 or 24 will have a voltage level represented by 91. As the incoming signal fades, the detector output voltage will drop to a first lower voltage 92, this level when combined with the output voltage from the other detector in the summing amplifier being below the first predetermined reference voltage 90. At this point, the D/A converter output signal remains constant and the frequency of the high stability VCXO is no longer controlled by the output of the phase-frequency detector 67, but rather is controlled by its own free-running frequency stability characteristics. If the detector output voltage 91 rises above the first lower output voltage shown at 92, the high stability VCXO 68 will again track the low stability VCXO 18 and have its frequency controlled by the phase-frequency detector 67.

A second predetermined reference voltage 94 is chosen so that if the output of one of the detectors 22 or 24 drops below a second lower output voltage 93, the output of the summing amplifier 66 will cause the output of a second comparator 96 to go high, thereby connecting the inverting amplifier 56 to the switch second position 64. This results in the output 70 of the phase frequency detector 67 being connected directly to the low stability VCXO 18, thereby creating a conventional phase lock loop in which the phase and frequency of the low stability VCXO 18 is compared with and made to coincide with the phase and frequency of the high stability VCXO 68. When the output signal from the summing amplifier 66 rises to the second predetermined reference voltage 94, the switch 60 reverts to the first position 62 and the high stability VCXO 68 continues to be free-running while the low stability VCXO is controlled by the differential amplifier output signal 54. A further increase in the summing amplifier 66 output voltage to the first predetermined reference voltage 90 enables the clock signal from the A/D clock generator 84 and the high stability VCXO 68 begins to again track the low stability VCXO 18 as previously explained.

It should now be apparent that a system for maintaining phase synchronization of a first clock signal having a relatively low free-running frequency stability with an incoming signal has been described in which the first clock signal is controlled by the incoming signal under strong signal conditions and by a second clock signal having a relatively high free-running frequency stability during periods of signal fading. This system provides a means for maximizing the probability that phase synchronization between the first clock signal and the incoming signal will be maintained during periods of signal fade.

What is claimed is:

1. A system for locally generating a clock signal in synchronization with a received input signal and for maintaining such synchronization during a temporary loss of said input signal, said system comprising:

first oscillator means responsive to said input signal for supplying a clock signal to be synchronized with said input signal;

second oscillator means having a greater free running frequency stability than that of said first oscillator means;

means for determining whether or not said clock signal is synchronized with said input signal;

means responsive to said clock signal and input signal being synchronized for causing said second oscillator means to supply an output signal synchronized with said clock signal; and means responsive to said clock signal and input signal not being synchronized for causing said first oscillator means to supply said clock signal in synchronization with said second oscillator means output signal.

2. A system for maintaining synchronization of a clock signal with an incoming signal comprising:

a first oscillator having an output clock signal to be synchronized with said incoming signal;

means for controlling the frequency of said first oscillator by said incoming signal;

a second oscillator having a more stable free-running frequency stability than said first oscillator;

first means for causing said second oscillator to track said first oscillator when said incoming signal is phase synchronized with said output clock signal; and second means for causing said first oscillator to track said second oscillator when said incoming signal level is below a predetermined threshold level.

3. The system of claim 2 wherein said incoming signal comprises a continuous wave carrier modulated by a first code generator and said output clock signal is to be synchronized with said first code generator modulation signal, said means for controlling the frequency of said first oscillator comprising:

a second code generator having an output signal coded in accordance with the output signal of said first code generator and whose output phase and frequency is controlled by said first oscillator, means;

means for comparing the phase of said second code generator output signal and said first code generator output signal modulated on said incoming signal; and means for generating an adjustment signal for said first oscillator whereby the output of said second code generator will have a predetermined phase relationship to the output of said first code generator.

4. The system of claim 3 wherein said first and second code generators are pseudo-random code generators.

5. The system of claim 4 wherein said second code generator has two output signals having a predetermined phase relationship to each other, said output signals being designated as an early code signal and a late code signal, and said means for comparing comprises:

a local oscillator;

means for generating a first phase modulated signal by phase modulating said local oscillator output signal by said early code signal;

means for generating a second phase modulated signal by phase modulating said local oscillator output signal by said late code signal;

means for generating a first detected signal by detecting said first phase modulated signal; and second means for generating a second detected signal by detecting said second phase modulated signal whereby the amplitude ratio of said first and second detected signal is related to a phase difference between said first and second code generator output signals.

6. The system of claim 5 wherein said means for generating an adjustment signal comprises a differential amplifier having an output signal related to an amplitude difference between said first and second detected signals.

7. The system of claim 6 wherein said first means for causing said second oscillator to track said first oscillator comprises:

a phase-frequency detector for generating a feedback output signal related to a difference in phase and frequency between said first and second oscillator output signals; and means for controlling the frequency and phase of said second oscillator by a signal related to said feedback output signal until said second oscillator output signal is in phase with said first oscillator output signal.

8. The system of claim 7 wherein said second means for causing said first oscillator to track said second oscillator comprises:

switch means for connecting said phase-frequency detector feedback output signal to said first oscillator, thereby disconnecting said differential amplifier from said first oscillator;

disconnection means for causing said second oscillator to become free-running;

means responsive to the sum of said first and second detected signals when said sum drops below a first predetermined level for activating said disconnection means thereby causing said second oscillator to become free-running; and means responsive to the sum of said first and second detected signals when said sum drops below a second predetermined level for causing said switch means to connect said phase frequency detector feedback output signal to said first oscillator, thereby resulting in said first oscillator tracking said second oscillator.

9. The system of claim 8 wherein said second predetermined level is lower than said first predetermined level.

10. The system of claim 8 wherein said disconnection means comprises:

an analog-to-digital converter having said phase-frequency feedback output signal as an input;

a digital-to-analog converter for converting the output of said analog-to-digital converter to an analog signal for controlling the frequency of said second oscillator;

clocking means for controlling said analog-to-digital and means for blocking said clocking means when the sum of said first and second detected signals is below said first predetermined level, thereby causing said second oscillator to be unaffected by said phase-frequency detector feedback output signal.

11. The system of claim 2 further comprising third means for causing said second oscillator to become free running when said incoming signal level drops to a predetermined level above said predetermined threshold level.

12. In a spread spectrum receiver, a means for maintaining a clock signal in phase synchronism with a code modulated on a received carrier signal, comprising:
  a first clock signal generator;
  a code generator having a coded output signal corresponding to said modulated code and whose phase and frequency is controlled by said first clock signal generator;
  first means for controlling said code generator by said first clock signal generator so that said code generator coded output signal has a predetermined phase relationship with respect to said modulated code when said first clock signal generator is phase synchronized with said modulated code;
  a second clock signal generator having a more stable free-running frequency stability than said first clock signal generator;
  means for controlling the frequency of said second clock signal generator by said first clock signal generator when said code generator is phase synchronized with said modulated code; and
  second means for controlling the frequency of said first clock signal generator by said second clock signal generator when said carrier signal level is below a predetermined threshold level.

13. The means of claim 12 further comprising means for causing said second clock signal generator to become free running when said carrier signal level drops to a predetermined signal level that is greater than said predetermined threshold level.

14. The means of claim 13 wherein said modulated code is a pseudo-random code and said code generator is a pseudo-random code generator.

15. A method for maintaining synchronization of a first oscillator with an incoming signal comprising the steps of:
  controlling the frequency of said first oscillator by said incoming signal when said incoming signal is phase synchronized with said first oscillator;
  controlling the frequency of a second oscillator having a more stable free-running frequency stability than said first oscillator by said first oscillator when said incoming signal is phase synchronized with said first oscillator; and
  controlling the frequency of said first oscillator by said second oscillator when said incoming signal level is below a predetermined threshold level.

16. The method of claim 15 further comprising the step of causing said second oscillator to become free-running when said incoming signal level drops to a predetermined level that is greater than said predetermined threshold level.

17. The method of claim 16 wherein said incoming signal comprises a continuous wave carrier modulated by a modulation code and said first oscillator controls a code generator having a code output corresponding to said modulation code, the phase and frequency of said code generator output code being controlled by said first oscillator whereby said first oscillator and said incoming signal are synchronized when said modulation code and said code generator have a predetermined phase relationship with respect to each other.

18. The method of claim 17 wherein said modulation code is a pseudo-random code and said code generator is a pseudo-random code generator.

* * * * *